US011014659B2

(12) United States Patent
Schank et al.

(10) Patent No.: US 11,014,659 B2
(45) Date of Patent: May 25, 2021

(54) ROTORCRAFT FLAPPING LOCK

(71) Applicant: BELL HELICOPTER TEXTRON INC., Fort Worth, TX (US)

(72) Inventors: Troy Schank, Keller, TX (US); Frank B. Stamps, Colleyville, TX (US)

(73) Assignee: Bell Helicopter Textron Inc., Providence, RI (US)

( * ) Notice: Subject to any disclaimer, the term of this patent is extended or adjusted under 35 U.S.C. 154(b) by 0 days.

(21) Appl. No.: 16/042,706

(22) Filed: Jul. 23, 2018

(65) Prior Publication Data

US 2020/0055593 A1 Feb. 20, 2020

Related U.S. Application Data

(60) Division of application No. 14/954,694, filed on Nov. 30, 2015, now Pat. No. 10,029,783, which is a continuation of application No. 13/949,766, filed on Jul. 24, 2013, now Pat. No. 9,327,831.

(60) Provisional application No. 61/830,402, filed on Jun. 3, 2013, provisional application No. 61/826,158, filed on May 22, 2013.

(51) Int. Cl.
| | | |
|---|---|---|
| *B64C 27/41* | (2006.01) |
| *B64C 27/30* | (2006.01) |
| *B64C 27/50* | (2006.01) |
| *B64C 27/52* | (2006.01) |
| *B64C 11/28* | (2006.01) |
| *B64C 27/605* | (2006.01) |
| *B64C 29/00* | (2006.01) |
| *B64C 27/32* | (2006.01) |
| *B64C 27/615* | (2006.01) |

(52) U.S. Cl.
CPC .............. *B64C 27/30* (2013.01); *B64C 11/28* (2013.01); *B64C 27/32* (2013.01); *B64C 27/41* (2013.01); *B64C 27/50* (2013.01); *B64C 27/52* (2013.01); *B64C 27/605* (2013.01); *B64C 27/615* (2013.01); *B64C 29/0033* (2013.01)

(58) Field of Classification Search
CPC ... B64C 11/28; B64C 27/50; B64C 2700/628; B64C 27/30; B64C 27/41
See application file for complete search history.

(56) References Cited

U.S. PATENT DOCUMENTS

| | | | | |
|---|---|---|---|---|
| 5,209,429 A | * | 5/1993 | Doolin et al. | ........... B64C 27/32 244/17.11 |
| 5,951,251 A | * | 9/1999 | Mondet et al. | ......... B64C 27/50 416/107 |
| 5,951,252 A | * | 9/1999 | Muylaert | ................ B64C 27/39 416/140 |
| 9,487,291 B2 | * | 11/2016 | Zientek et al. | ....... B64C 27/463 |

* cited by examiner

*Primary Examiner* — Brian M O'Hara
(74) *Attorney, Agent, or Firm* — James E. Walton

(57) ABSTRACT

A method of selectively preventing flapping of a rotor hub includes providing a flapping lock proximate to a rotor hub and shaft assembly and moving the flapping lock from an unlocked position to a locked position, the flapping lock operable in the locked position to prevent at least some flapping movement of the rotor hub relative to the shaft, the flapping lock operable in the unlocked position to allow the at least some flapping movement of the rotor hub relative to the shaft.

5 Claims, 10 Drawing Sheets

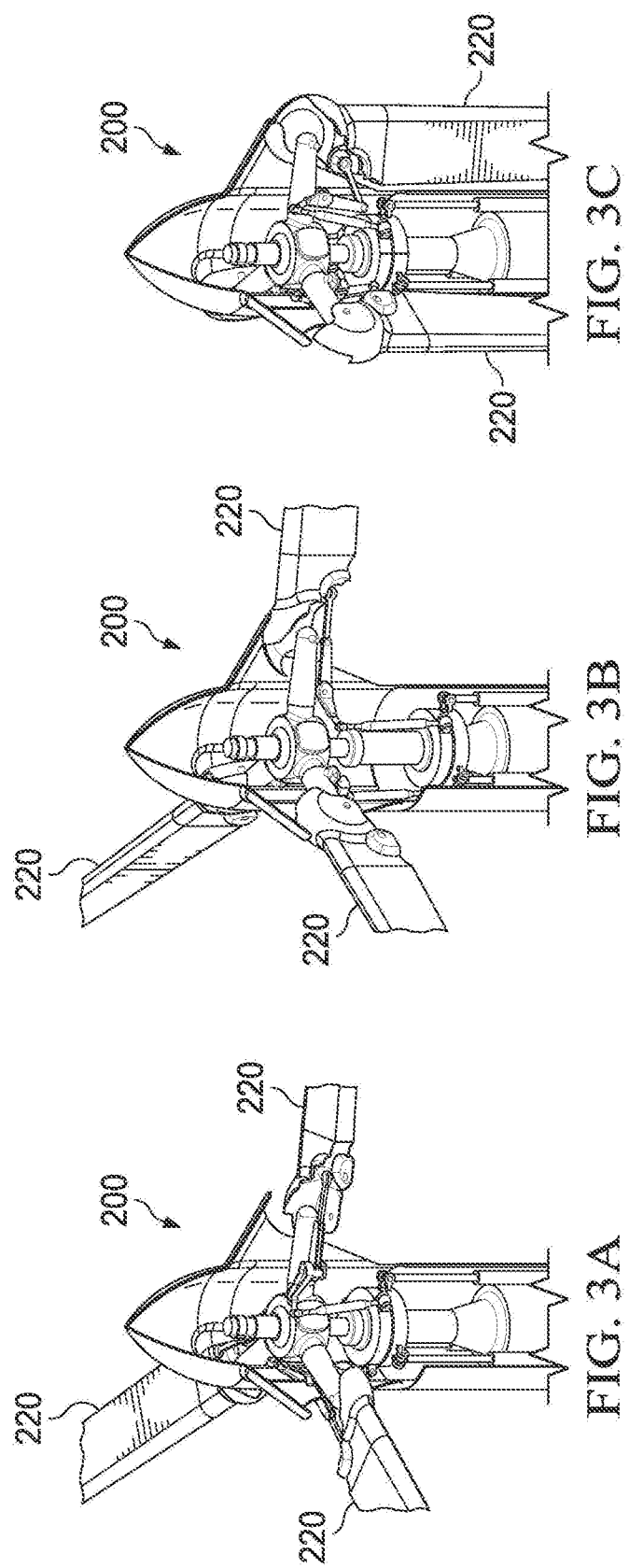

ROTORCRAFT FLAPPING LOCK

CROSS-REFERENCE TO RELATED APPLICATIONS

This application is a divisional application of prior application Ser. No. 14/954,694, filed 30 Nov. 2015, which is a continuation of prior application Ser. No. 13/949,766, filed 24 Jul. 2013, which claims the benefit of Provisional Application No. 61/830,402 filed, filed 3 Jun. 2013, and Provisional Application No. 61/826,158, filed 22 May 2013, all of which are incorporated herein by reference for all purposes.

BACKGROUND

1. Field of the Invention

This invention relates generally to rotor systems, and more particularly, to a rotorcraft flapping lock.

2. Description of Related Art

One example of an aircraft is a tiltrotor. A tiltrotor aircraft may operate in a helicopter mode by tilting its nacelles upright and in an airplane mode by tilting its nacelles forward. Tiltrotor aircraft may generate greater forward speed in airplane mode than in helicopter mode because, in airplane mode, the rotor blades are oriented to generate greater thrust propelling the aircraft forward (somewhat analogous to a propeller).

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIGS. 3A, 3B, and 3C show an example transition of the rotor system of FIGS. 2A-2H from zero-feather mode (in FIG. 3A) to blade feather mode (in FIG. 3B) to blade fold mode (in FIG. 3C) according to one example embodiment.

Figure 1A:
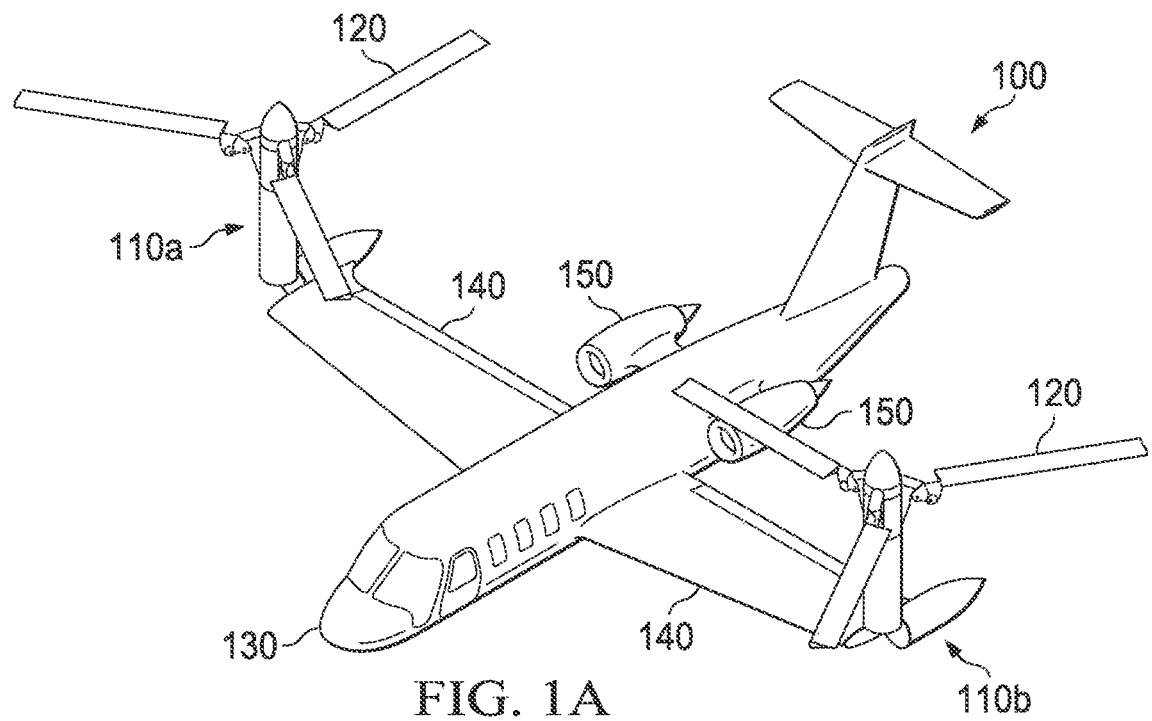
FIG. 1A shows a tiltrotor aircraft in helicopter mode according to one example embodiment.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1A shows a rotorcraft 100 according to one example embodiment. Rotorcraft 100 features rotor systems 110a and 110b, blades 120, a fuselage 130, and a wing 140.

Rotor system 110 may rotate blades 120. Rotor system 110 may include a control system for selectively controlling the pitch of each blade 120 in order to selectively control direction, thrust, and lift of rotorcraft 100. In the example of FIG. 1A, rotorcraft 100 represents a tiltrotor aircraft, and rotor systems 110a and 110b feature rotatable nacelles. In this example, the position of nacelles, as well as the pitch of blades 120, can be selectively controlled in order to selectively control direction, thrust, and lift of rotorcraft 100. Fuselage 130 represents the main body of rotorcraft 100 and may be coupled to rotor system 110 (e.g., via wing 140) such that rotor system 110 and blades 120 may move fuselage 130 through the air. Wing 140 may also generate lift during forward flight.

Teachings of certain embodiments relating to rotor systems described herein may apply to rotor system 110 and/or other rotor systems, such as non-tilting rotor and helicopter rotor systems. It should also be appreciated that teachings from rotorcraft 100 may apply to aircraft other than rotorcraft, such as airplanes and unmanned aircraft, to name a few examples.

In the example of FIG. 1A, rotorcraft 100 may operate in a helicopter mode by tilting the nacelles upright and in an airplane mode by tilting the nacelles forward. Rotorcraft 100 may generate greater forward speed in airplane mode than in helicopter mode because, in airplane mode, blades 120 are oriented to generate greater thrust propelling the aircraft forward (somewhat analogous to a propeller).

Teachings of certain embodiments recognize the ability of aircraft such as rotorcraft 100 to generate additional forward thrust (in addition to or in place of the forward thrust generated by blades 120). For example, rotorcraft 100 may be equipped with jet engines 150 that provide additional forward thrust. In the example of FIG. 1A, jet engines 150 are mounted to fuselage 130 and are generally separated from rotor systems 110a and 110b. In other example embodiments, jet engines 150 may also represent the same engines that power rotor systems 110a and 110b.

Regardless of the mechanism for providing additional forward thrust, teachings of certain embodiments recognize that the existence of blades 120 may place an upper limit on the forward speed of the aircraft. For example, if the forward speed of rotorcraft 100 is too high, aerodynamic forces could damage blades 120 or even separate them from the aircraft.

Figure 1B:
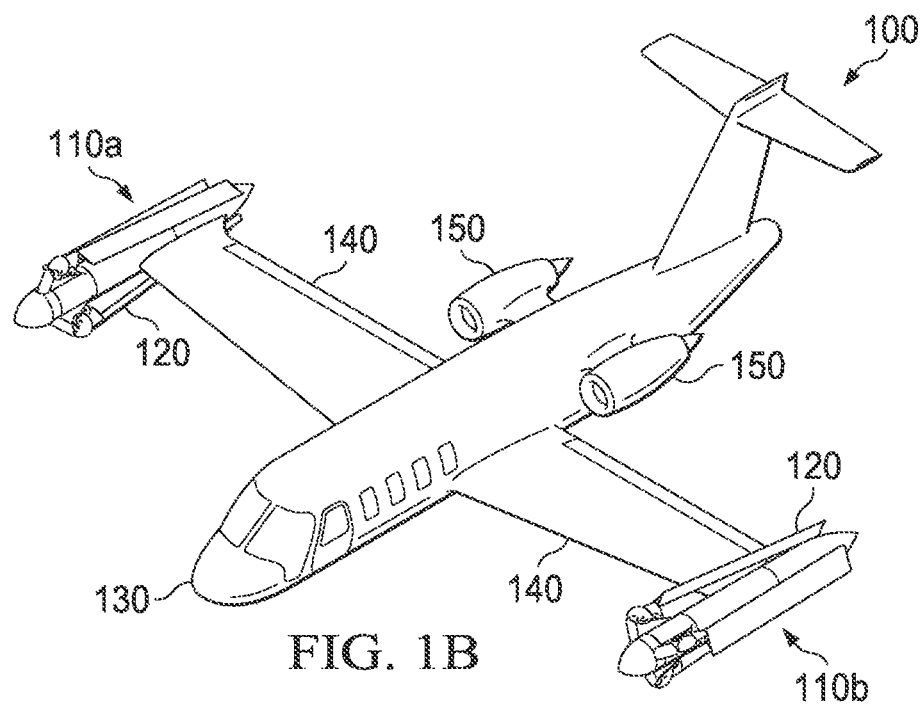
FIG. 1B shows the tiltrotor aircraft of FIG. 1A in high-speed forward flight mode according to one example embodiment.

Accordingly, teachings of certain embodiments recognize the capability to fold rotor blades to reduce aerodynamic forces on the blades during high-speed forward flight. FIG. 1B shows rotorcraft 100 with blades 120 folded. In the example of FIG. 1B, jet engines 150 may provide thrust during forward flight, and wing 140 may generate lift. In this example, blades 120 in the folded position as shown in FIG. 1B may result in less drag than when blades 120 are in the extended position as shown in FIG. 1.

Teachings of certain embodiments also recognize that the ability to safely and efficiently fold blades and therefore increase the forward-speed of the aircraft may allow blades to be somewhat flatter (have less blade twist) than, for example, typical tiltrotor blades. For example, conventional tiltrotor blades may operate in two modes: helicopter mode and airplane mode. Some blades 120 may include additional twist to improve performance during airplane mode. Folding blades, however, may not spend much time in airplane mode, and therefore, performance in airplane mode may not be a primary concern. For example, in some embodiments, airplane mode may represent a relatively-short transition period between helicopter mode and high-speed forward flight (e.g., jet mode) when blades 220 are folded. In this example, folding blades 220 may be designed primarily for helicopter mode, which may allow for somewhat flatter blade designs.

In addition, teachings of certain embodiments recognize that reducing twist in tiltrotor blades may improve folding performance of blades 220. For example, as will be explained in greater detail below, teachings of certain embodiments recognize that driving all blade leading edges "edge-on" into the freestream may reduce aerodynamic loads on the blades during blade folding. A highly-twisted blade, however, may not be able to become fully edge-on because, even if a portion of the blade leading edges are driven into the freestream, the blade twist causes at least part of each blade to be "end flat" relative to the freestream. A blade surface that is "end flat" may have higher aerodynamic loads than a blade surface that is edge-on. Unlike a highly-twisted blade, a blade with less twist may be able to drive a greater percentage of the blade leading edges into the freestream while having a lower percentage of the blade surfaces "end flat" relative to the free stream. Accordingly, teachings of certain embodiments recognize that reducing twist in blades 220 may improve folding performance by reducing aerodynamic loads on blades 220 during the folding process.

Furthermore, teachings of certain embodiments recognize the capability to fold rotor blades safely and with fewer components. As will be explained in greater detail below, teachings of certain embodiments recognize the capability to fold all rotor blades in a rotor system collectively without providing an actuator for each rotor blade. Teachings of certain embodiments also recognize the ability to satisfy reliability requirements and avoid jam-type faults of geared actuators.

For example, as will be explained in greater detail below, teachings of certain embodiments recognize the capability to prevent failures in which some rotor blades are folded and others are not and to prevent failures in which the rotor blades are only partially deployed (e.g., between folded and extended states). By preventing such failures, rotorcraft 100 may be able to land safely even if the folding mechanism malfunctions. For example, if the folding mechanism malfunctions while the rotor blades are folded, rotorcraft 100 may land on a runway like an aircraft. If, on the other hand, the folding mechanism malfunctions while the blades are extended, rotorcraft 100 may land on a landing pad in helicopter mode.

FIGS. 2A-2H show perspective views of a rotor system 200 according to one example embodiment. The example rotor system 200 may be equipped on a rotorcraft such as the example rotorcraft 100 of FIGS. 1A and 1B.

Figure 2A:
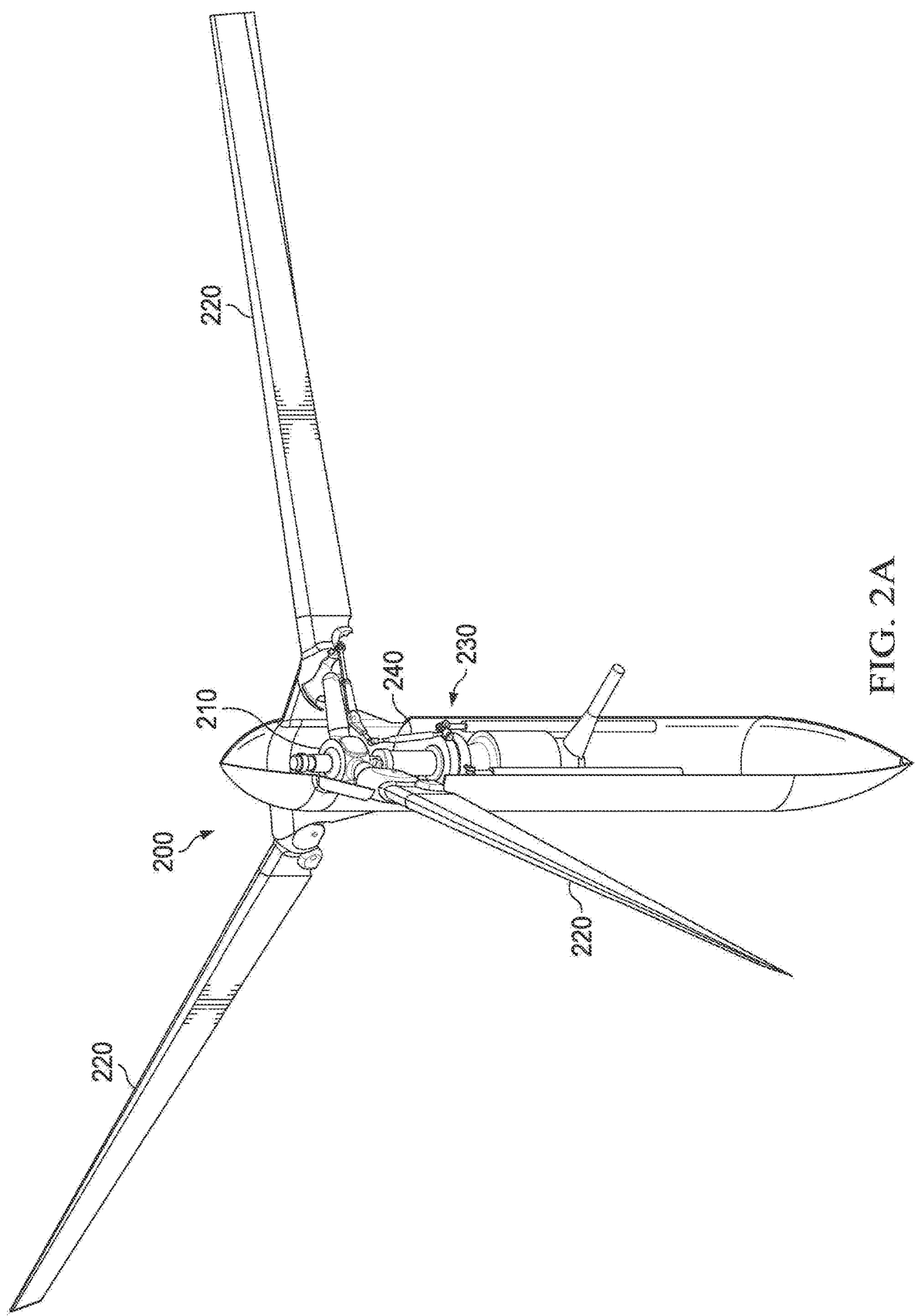
FIGS. 2A-2H show perspective views of a rotor system that may be equipped on a rotorcraft such as the example tiltrotor aircraft of FIGS. 1A and 1B.
Figure 2B:
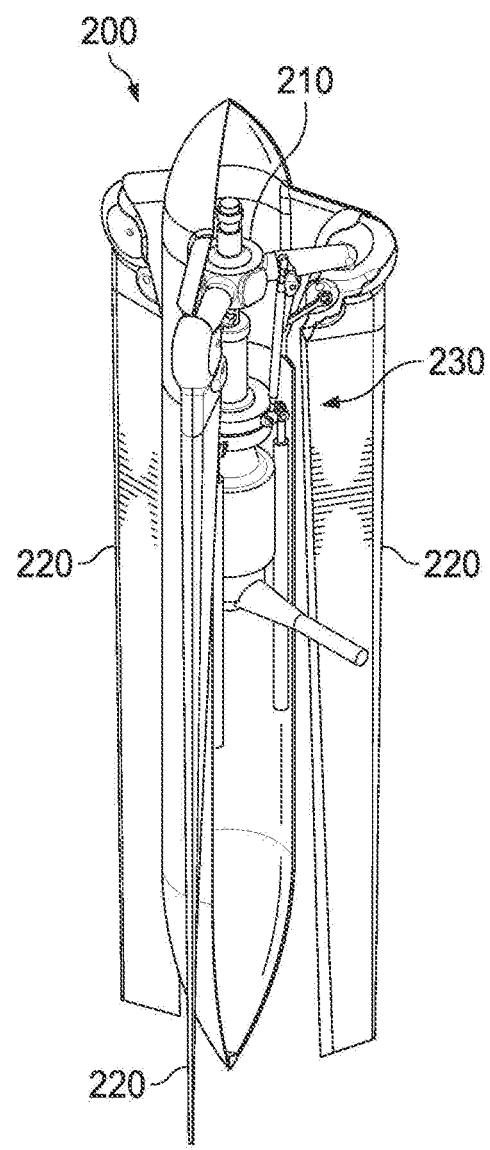
Figure 2C:
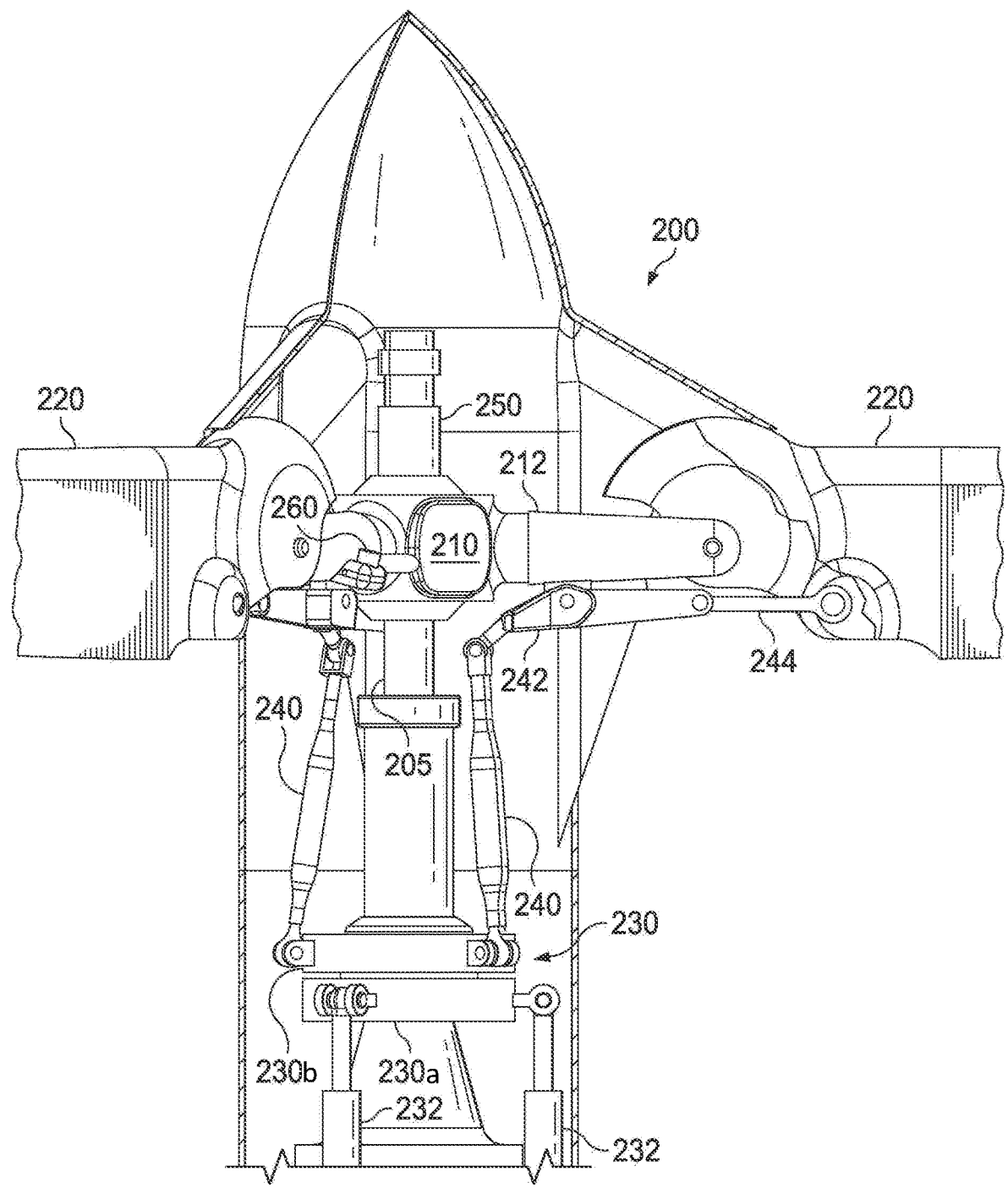
Figure 2D:
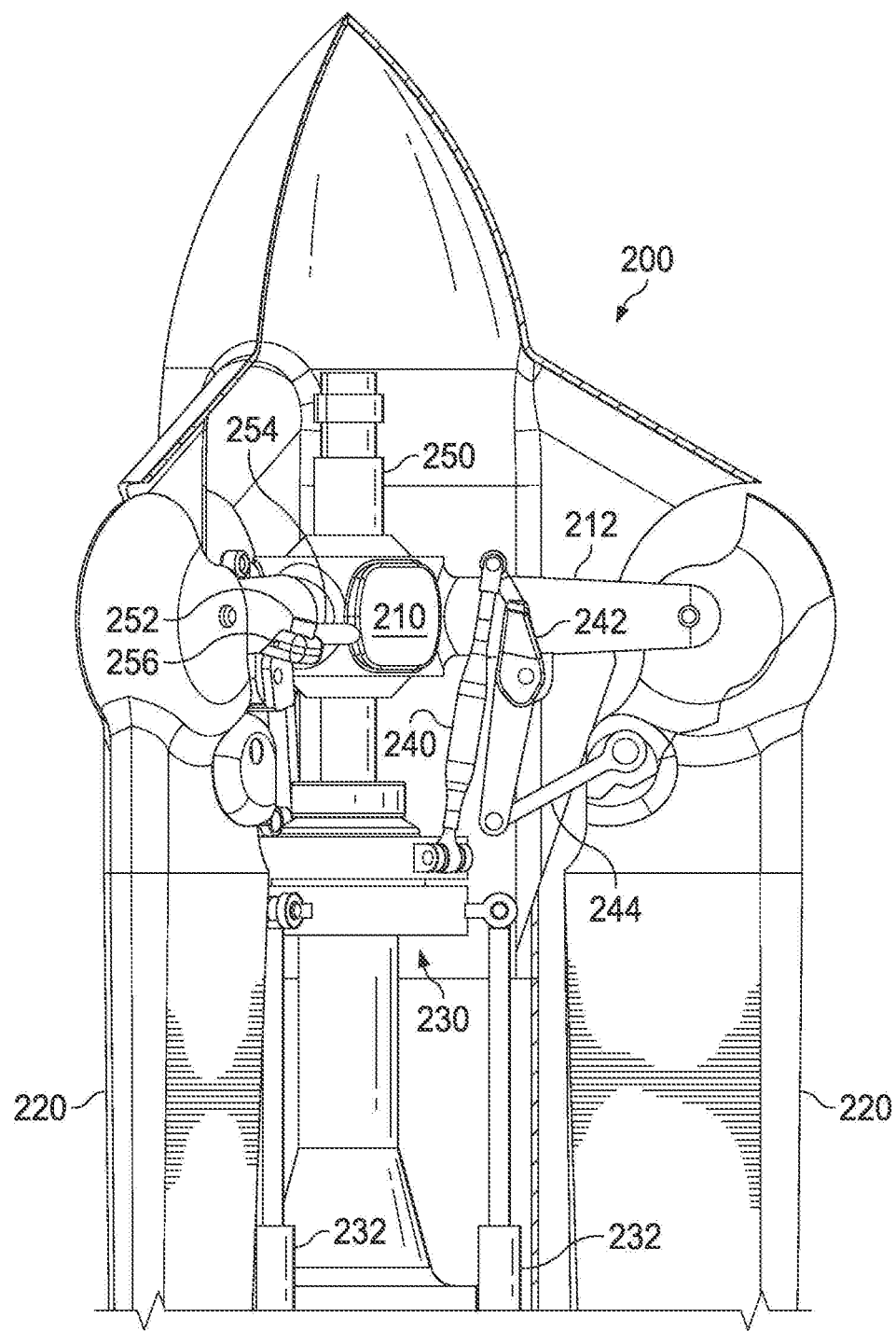

FIGS. 2A and 2B show larger perspective views of rotor system 200 with blades 220, and FIGS. 2C-2H show perspective views of various components of rotor system 200. In the example of FIGS. 2A and 2C, blades 220 are extended outwards (i.e., blades 220 are in a deployed state). Blades 220 may be in a deployed state, for example, during helicopter mode and airplane mode. In the example of FIGS. 2B and 2D, on the other hand, blades 220 are folded inwards. Blades 220 may be folded inwards, for example, during high-speed forward flight.

In the example of FIGS. 2A-2D, rotor system 200 features a shaft 205, a hub 210, a grip 212, blades 220, a swashplate 230, swashplate actuators 232, links 240, pitch horn/fold cranks 242, and fold links 244. In some examples, rotor system 200 may include more or fewer components.

Shaft 205 may represent one or more components of a power train, which may also include other components such as a power source. The power source, shaft 205, and hub 210 are mechanical components for transmitting torque and/or rotation. The power train may include a variety of components, including an engine, a transmission, and differentials. In operation, the drive shaft receives torque or rotational energy from the power source and rotates hub 210. Rotation of hub 210 causes blades 220 to rotate about the drive shaft.

Swashplate 230 translates rotorcraft flight control input into motion of blades 220. Because blades 220 are typically spinning when the rotorcraft is in flight (e.g., in helicopter mode), swashplate 230 may transmit flight control input from the non-rotating fuselage to the hub 210, blades 220, and/or components coupling hub 210 to blades 220 (e.g., grip 212).

In some examples, swashplate 230 may include a non-rotating swashplate ring 230a and a rotating swashplate ring 230b. Non-rotating swashplate ring 230a does not rotate with drive shaft 205, whereas rotating swashplate ring 230b does rotate with drive shaft 205.

In some embodiments, operation of rotor system 200 may be organized into five operation phases: helicopter mode, conversion mode, tiltrotor airplane mode, folding mode (may also be referred to as transition mode), and high-speed forward flight mode. In helicopter mode, for example, the nacelles are tilted upright to generate greater lift. In this example, translating the non-rotating swashplate ring 230a along the axis of the drive shaft causes the links 240 to move up or down. This changes the pitch angle of all blades 220 equally, increasing or decreasing the thrust of the rotor and causing the aircraft to ascend or descend. Tilting the non-rotating swashplate ring 230a causes the rotating swashplate ring 230b to tilt, moving the links 240 up and down cyclically as they rotate with the drive shaft. This tilts the thrust vector of the rotor, causing rotorcraft 100 to translate horizontally.

In conversion mode, rotor system 200 may convert from helicopter mode to tiltrotor airplane mode. For example, in some embodiments, rotor system 200 may convert from helicopter mode to tiltrotor airplane mode by tilting the nacelles from an upright position to a forward position, which may result in blades 220 generating greater forward thrust.

In folding mode, rotor system 200 may also convert from tiltrotor airplane mode to high-speed forward flight mode by folding blades 220 back. In one example embodiment, propulsion may be transferred from the proprotors to thrusting engines (e.g., jet engines 150) at a specified speed. Next, rotorcraft 100 may stop and lock rotor systems 200 such that blades 220 cease spinning. For example, rotor collective may be adjusted to reduce torque and rotor speed is reduced (e.g., to approximately 70% RPM). A flapping lock 250 may be engaged to prevent large flap displacements with reduced CF. After engaging flapping lock 250, collective pitch may be increased (e.g., to about) 90° so as to stop rotor motion. The rotor may then be precessed to a specified azimuth angle and then locked.

Figure 2E:
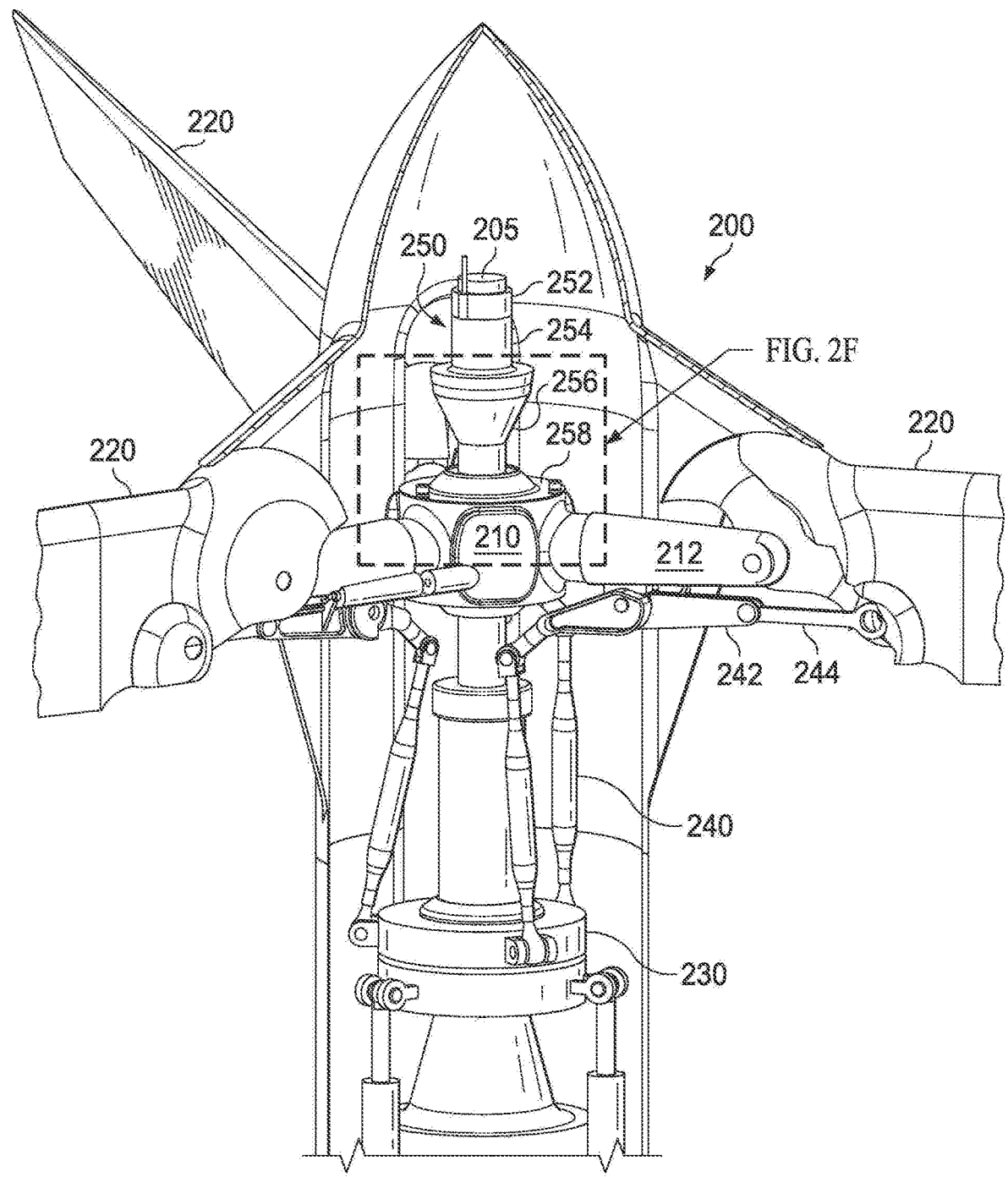
Figure 2F:
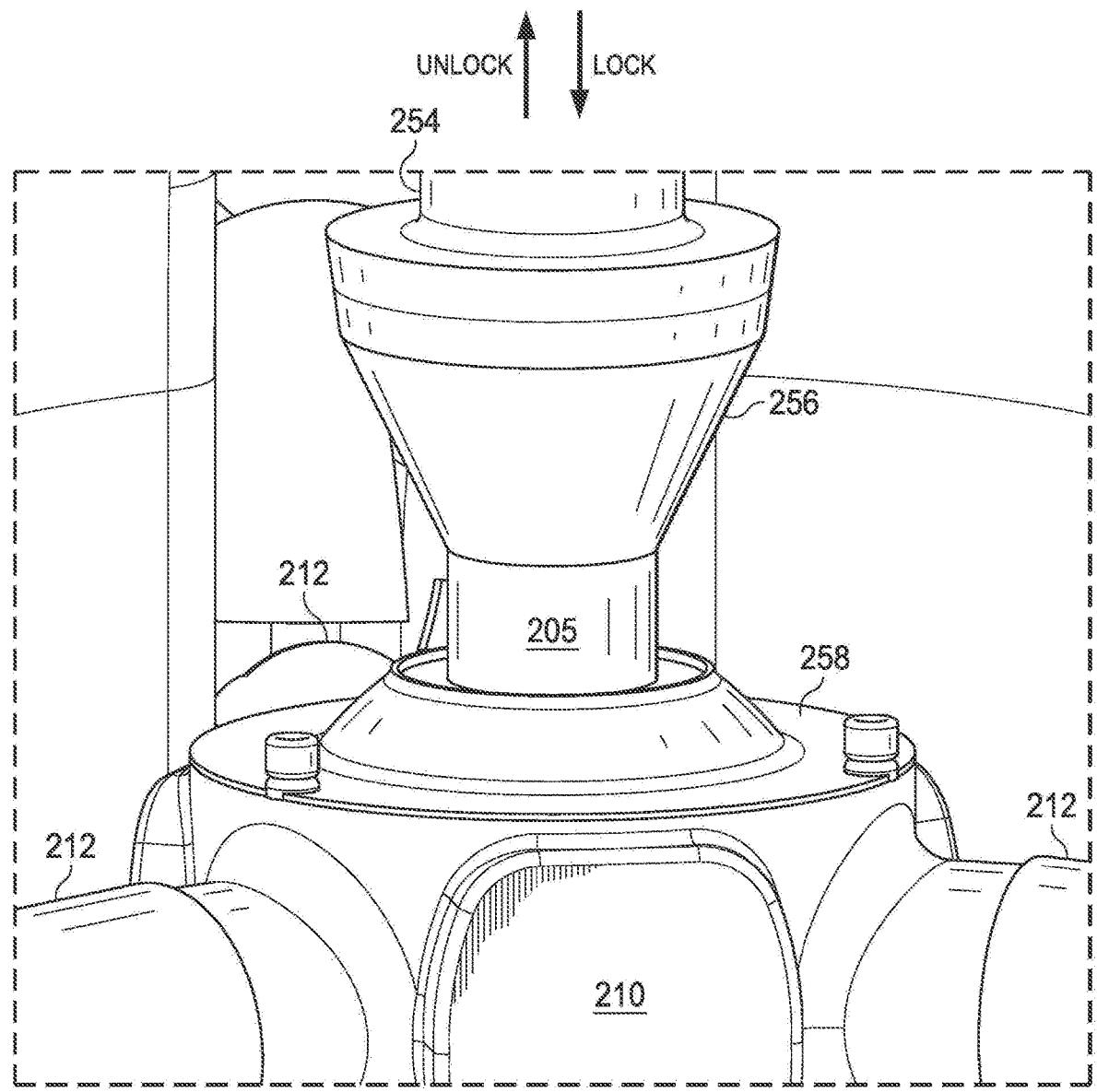

FIGS. 2E and 2F show perspective views of flapping lock 250 according to one example embodiment. In the example of FIGS. 2E and 2F, flapping lock 250 features an actuator 252, a downstop 254, load absorber 256, and a flapping stop 258. In operation, according to one example embodiment, flapping lock 250 may prevent large flapping displacements by pushing downstop 254 towards flapping stop 258, which restricts flapping movement of hub 210).

In some embodiments, flapping lock 250 may be deployed in a locked position, an unlocked position, or a partially-locked position (e.g., between the locked and unlocked position). In the locked position, flapping lock 250 may prevent at least some flapping of hub 210 relative to shaft 205 (e.g., preventing large flapping displacements by pushing downstop 254 towards flapping stop 258, which restricts flapping movement of hub 210). In the unlocked position, on the other hand, such flapping movement may be allowed. In a partially-locked position, load absorber 256 may be in contact with flapping stop 258 to resist some flapping movements.

In the example of FIGS. 2E and 2F, shaft 205 and hub 210 may move relative to one another when flapping lock 250 is in an unlocked position. In one example embodiment, shaft 205 may move conically relative to a pivot point, and hub 210 may move spherically about a spherical element. Moving flapping lock 250 to a locked position by pushing downstop 254 towards flapping stop 258 may prevent downstop 254 and hub 210 from moving relative to one another.

Teachings of certain embodiments recognize that load absorber 256 may minimize loads and maximize rotor system stability. For example, without load absorber 256, flapping lock 250 would prevent flapping by locking rigid downstop 254 against rigid flapping stop 258. This rigid locking mechanism, however, would result in a load spike on the rotor system and drive train when the rigid downstop 254 contacts rigid flapping stop 258. A large load spike, however, could cause substantial damage to the rotor system as well as other parts of the aircraft.

Providing load absorber 256 between downstop 254 and flapping stop 258 may help prevent load spikes by reducing rotor flapping more gradually over time as downstop 254 moves closer to flapping stop 258. In this example, allowable rotor flapping may be reduced as downstop 254 moves closer to flapping stop 258 until downstop 254 moves close enough to flapping stop 258 to eliminate most, if not all, rotor flapping.

In addition, reducing rotor flapping gradually may allow flapping lock 250 to prevent rotor system 200 from exceeding its maximum allowable flapping threshold during locking. For example, rotor system 200 may have a maximum allowable flapping threshold that changes as a function of rotor rotation speed and collective angle during the in-flight folding process. Load absorber 256 may provide a spring rate profile that allows flapping lock 250 to reduce flapping at a rate that corresponds to how the maximum allowable flapping threshold changes during folding or at least maintain rotor flapping at a value under the maximum allowable flapping threshold function.

Load absorber 256 may be made from any suitable material. In some embodiments, load absorber 256 is formed from an elastomeric material. An elastomeric material is a material, such as a polymer, having the property of viscoelasticity (colloquially, "elasticity"). An example of an elastomeric material is rubber. Elastomeric materials generally have a low Young's modulus and a high yield strain when compared to other materials. Elastomeric materials are typically thermosets having long polymer chains that cross-link during curing (i.e., vulcanizing). Elastomeric materials may absorb energy during compression.

Once the flapping lock is engaged, the rotor may be rotated and locked at a specified azimuth angle, and blades 220 may be folded. In the example of FIGS. 2C-2F, rotor system 200 features several components that may aid in folding blades 220, including links 240, pitch horn/fold cranks 242, and fold links 244. The pitch horn may double as the fold crank depending on which mode of operation the rotor is in.

Figure 2G:
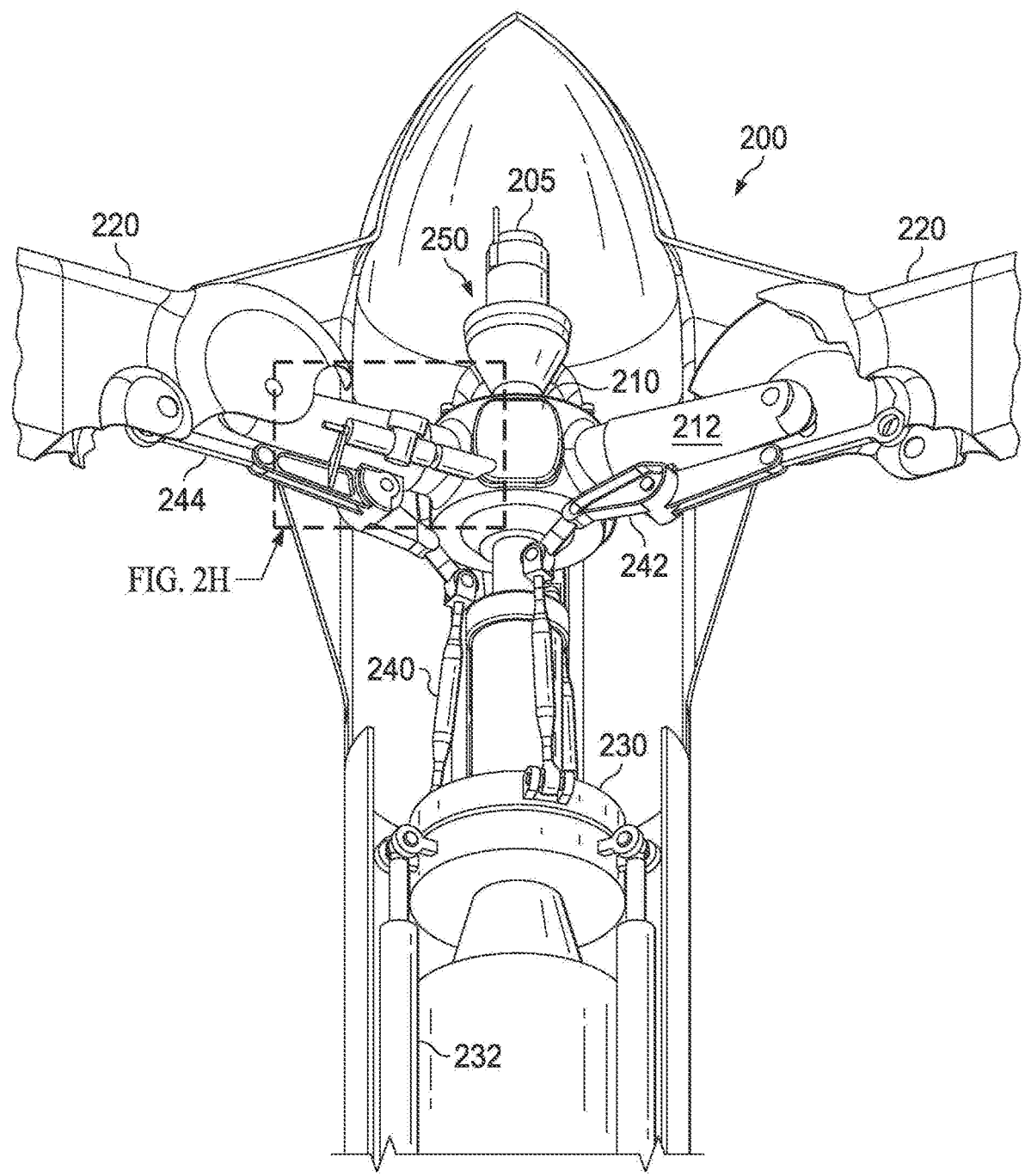
Figure 2H:
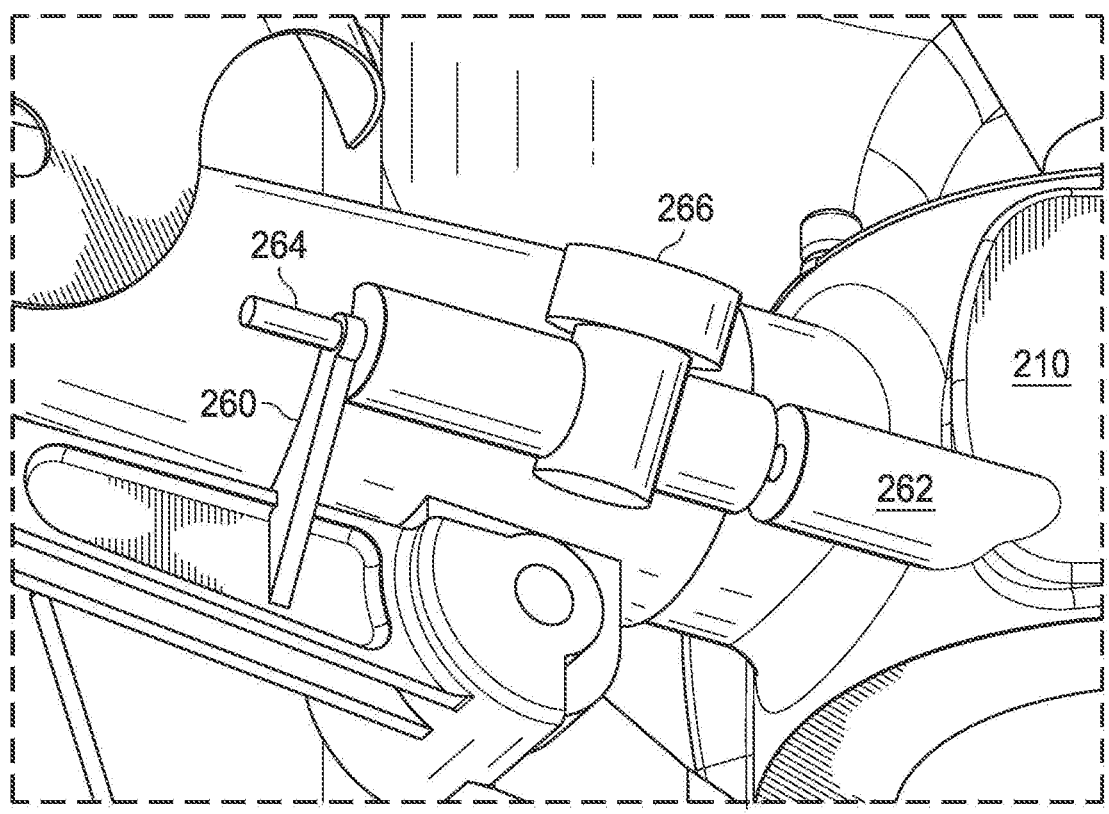

In the example of FIGS. 2G-2H, the mode of operation may be determined by a translating lock pin 264 on the blade grip, which depending on its position, locks out feather or fold motions. In the example of FIG. 2H, a pin actuator 266 may move translating lock pin 264 between a feather mode and a fold mode. In one example embodiment, pin actuator 266 is a geared rotary actuator that drives translating lock pin 264 through a pinion gear.

In feather mode, the translating lock pin 264 is at an outward position to lock the fold crank in place (e.g., using fold lock 260) and free pitch displacements. In this mode, the input lever functions as a conventional pitch horn causing the cuff and blade to feather with cyclic and collective inputs from the swashplate. In fold mode, the translating lock pin 264 is at an inward position to lock the pitch displacement out (e.g., using feather lock 262) and allow blade fold. In this mode, the input lever effectively becomes a fold crank, driving the fold link and blade to fold along the nacelle with collective inputs.

Accordingly, to fold blades 220, translating lock pin 264 may be repositioned so as to disengage fold lock 260 and engage feather lock 262. Teachings of certain embodiments recognize that coupling engagement of fold lock 260 and feather lock 262 may prevent failures in which blades 220 are between modes of operation. For example, teachings of certain embodiments recognize that devices such as translating lock pin 264 may cause rotor system 200 to fail in either feather mode or fold mode, but not between feather mode and fold mode.

After disengaging fold lock 260 and engaging feather lock 262, blades may be folded back to a low drag configuration by actuating the swashplate collective position using swashplate actuators 232. Actuating the swashplate collective position may cause links 240 to rotate fold crank 242 about a fixed point, which may cause fold crank 242 to reposition fold link 244, which folds blades 220. To deploy the rotor from its folded state, the process may be conducted in reverse.

FIGS. 3A, 3B, and 3C show an example transition from zero-feather mode (in FIG. 3A) to blade feather mode (in FIG. 3B) to blade fold mode (in FIG. 3C) according to one example embodiment. When the rotor transitions from the deployed state to the folded state, swashplate 230 initially lowers (away from hub 210), driving all blade leading edges into the freestream (in an "edge-on" state). Teachings of certain embodiments recognize that driving all blade leading edges into the freestream may reduce aerodynamic loads on the blades.

At full collective, the effective aerodynamic torque may be zeroed on the rotor. At this position, the translating lock pin 264 on the cuff is aligned with the corresponding hole on grip 212 and is driven inward, locking pitch displacements, and simultaneously unlocking fold displacements. Swashplate 230 then moves up (toward hub 210) collectively and drives fold crank 242 and fold link 244, which in turn folds blades 220 edgewise along the nacelle. In the folded condition, links 240, fold crank 242 and fold links 244 may be compactly tucked within the nacelle for a clean, low drag configuration. To deploy the rotor from its folded state, the process may be reversed.

Blade fold angles may be monitored during the fold/deployment process. During blade fold, cyclic control inputs may be zeroed with only collective input such that all blade fold angles of a given rotor will be equal. In the fold process, blade angles between two rotor systems (e.g., rotor systems 110a and 110b) will be monitored and controlled to follow each other. Position feedback from the swashplate actuators 232, fold crank 242 and translating lock pin 264 may be used to determine control synchronization. In some embodiments, a failure of any component to follow an expected displacement command will immediately indicate a fault with mitigating action. In some embodiments, swashplate actuators 232 may have triplex redundancy built in and can remain functional with single and dual strand faults.

In the case that a lock failure occurs, such as a jam, the rotor would be 'stuck' in either the deployed state or folded state. In some embodiments, multiple translating lock pins 264 may be mechanically coupled together such that all locking mechanisms in a rotor system may succeed or fail together. Teachings of certain embodiments recognize that this bi-modal failure potential may allow the aircraft to land, depending on the failure state, in either helicopter mode or in airplane mode without harm to pilot and aircraft.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A method of selectively preventing flapping of a rotor hub, comprising:
   providing a flapping lock proximate to the rotor hub and shaft assembly;
   moving the flapping lock from an unlocked position to a locked position, the flapping lock operable in the locked position to prevent at least some flapping movement of the rotor hub relative to the shaft, the flapping lock operable in the unlocked position to allow the at least some flapping movement of the rotor hub relative to the shaft;
   wherein moving the flapping lock from the unlocked position to the locked position comprises moving a downstop in mechanical communication with the shaft towards a flapping stop in mechanical communication with the rotor hub.

2. The method of claim 1, further comprising supporting a load absorber positioned between the downstop and the flapping stop.

3. A method of folding a rotor blade of a rotorcraft, comprising:
   supporting a blade at an axis of rotation;
   reducing torque generated by the rotor blade;
   preventing flapping of the rotor blade;
   slowing rotation of the rotor blade;
   locking a rotational position of the rotor blade to a predetermined azimuth angle;
   preventing pitch displacements of the rotor blade; and
   pivoting the blade about the axis of rotation by repositioning a swashplate in mechanical communication with the blade.

4. The method of claim 3, wherein:
   reducing torque generated by the rotor blade comprises repositioning the swashplate to a first position;
   preventing flapping motions of the rotor blade comprises locking a hub in mechanical communication with the rotor blade at a substantially fixed flapping angle;
   slowing rotation of the rotor blade comprises repositioning the swashplate to a second position;
   preventing pitch displacements of the rotor blade comprises locking a grip associated with the rotor blade to the hub; and
   pivoting the rotor blade about the axis of rotation comprises repositioning the swashplate to a third position.

5. The method of claim 4, wherein pivoting the rotor blade about the axis of rotation comprises repositioning the swashplate to the third position further comprises:
   allowing folding movement of a linkage in mechanical communication with the swashplate by unlocking the linkage from the grip; and
   repositioning the swashplate to the third position such that the linkage pivots the rotor blade about the axis of rotation.

* * * * *